(12) United States Patent
Frink et al.

(10) Patent No.: US 10,109,915 B2
(45) Date of Patent: Oct. 23, 2018

(54) PLANAR NEAR-FIELD CALIBRATION OF DIGITAL ARRAYS USING ELEMENT PLANE WAVE SPECTRA

(71) Applicant: The United States of America as represented by the Secretary of the Navy, Washington, DC (US)

(72) Inventors: Andrew Frink, Bloomington, IN (US); George Whitaker, Albuquerque, NM (US); Jeffrey Maas, Arlington, VA (US); Kenneth W. O'Haver, Ellicott City, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 324 days.

(21) Appl. No.: 14/622,777

(22) Filed: Feb. 13, 2015

(65) Prior Publication Data

US 2015/0349419 A1    Dec. 3, 2015

Related U.S. Application Data

(60) Provisional application No. 61/939,416, filed on Feb. 13, 2014.

(51) Int. Cl.
*H04B 17/12*    (2015.01)
*H04B 17/21*    (2015.01)
*H01Q 3/26*    (2006.01)

(52) U.S. Cl.
CPC ............. *H01Q 3/267* (2013.01); *H04B 17/12* (2015.01); *H04B 17/21* (2015.01); *Y10T 29/49005* (2015.01)

(58) Field of Classification Search
CPC .......... H01Q 3/267; H01Q 3/28; H01Q 1/246; H01Q 25/00; H01Q 3/26; H01Q 3/34;
(Continued)

(56) References Cited

U.S. PATENT DOCUMENTS 5,063,529 A * 11/1991 Chapoton .............. H01Q 3/267
                                                                342/174
5,861,843 A *  1/1999 Sorace .................. H01Q 3/267
                                                                342/174
(Continued)

FOREIGN PATENT DOCUMENTS

EP            2173005           5/2010
WO     WO 2009079174 A1 *  6/2009 ........... G01S 7/4017
(Continued)

OTHER PUBLICATIONS

Sayers et al.("Planar Near-Field Measurement of Digital Phased Arrays Using Near-Field Scan Plane Reconstruction", IEEE Transactions on Antennas and Propagation, vol. 60, No. 6, Jun. 2012).*
(Continued)

*Primary Examiner* — Vladimir Magloire
*Assistant Examiner* — Nuzhat Pervin
(74) *Attorney, Agent, or Firm* — Christopher A. Monsey (57) ABSTRACT

A calibration method, applicable to element-level digital arrays operating in the receive mode, which utilizes the individual element plane wave spectra obtained from a single planar near-field scan. The method generates highly accurate near-field measurement derived amplitude and phase calibration of both large and small digital arrays as a function of array scan. The present disclosure provides digital array calibration methods and their potential uses in satellites and directional arrays.

7 Claims, 7 Drawing Sheets

(58) Field of Classification Search
CPC ........ H01Q 15/08; H04B 17/12; H04B 17/21; H04B 1/04; H04B 17/0085; Y10T 29/49005; G01J 3/42; G01R 29/10; G01S 7/4004; G01S 5/14; G01S 5/0252; G01S 7/4026; G01S 7/032
USPC ........................................................ 342/371
See application file for complete search history.

(56) References Cited

U.S. PATENT DOCUMENTS

| | | | |
|---|---|---|---|
| 5,999,120 A | 12/1999 | Yamada | |
| 6,356,233 B1 | 3/2002 | Miller et al. | |
| 6,507,315 B2* | 1/2003 | Purdy | H01Q 3/267 342/174 |
| 7,105,820 B2* | 9/2006 | Federici | G01J 3/42 250/339.02 |
| 7,119,739 B1* | 10/2006 | Struckman | G01R 29/10 342/174 |
| 7,362,266 B2* | 4/2008 | Collinson | H01Q 3/267 242/174 |
| 7,423,586 B2 | 9/2008 | Schieblich | |
| 7,522,095 B1* | 4/2009 | Wasiewicz | G01S 13/424 342/160 |
| 7,592,949 B2* | 9/2009 | Schantz | G01S 5/14 342/165 |
| 7,714,775 B2* | 5/2010 | Navarro | H01Q 3/267 342/174 |
| 7,714,782 B2 | 5/2010 | Davis et al. | |
| 7,808,430 B2 | 10/2010 | Carter et al. | |
| 7,859,452 B2* | 12/2010 | Schantz | H04B 5/0075 342/165 |
| 7,911,376 B2* | 3/2011 | Hardacker | H01Q 3/267 342/174 |
| 8,013,783 B2* | 9/2011 | Lomes | H01Q 3/267 342/165 |
| 8,154,452 B2* | 4/2012 | Webb | H01Q 3/267 342/174 |
| 8,212,716 B2* | 7/2012 | Goshen | H01Q 3/267 342/165 |
| 8,354,960 B2* | 1/2013 | Krich | H01Q 3/26 342/379 |
| 8,593,337 B2 | 11/2013 | Ookawa | |
| 8,643,538 B2* | 2/2014 | Schantz | H04B 5/0075 342/118 |
| 8,692,707 B2 | 4/2014 | Lee et al. | |
| 8,755,454 B2* | 6/2014 | Sorrells | H04B 1/04 375/295 |
| 8,842,040 B1* | 9/2014 | Dorsey | H01Q 3/267 342/174 |
| 8,957,808 B2* | 2/2015 | Ookawa | G01S 7/4004 342/165 |
| 8,976,845 B2* | 3/2015 | O'Keeffe | H04B 7/10 375/219 |
| 9,019,153 B1* | 4/2015 | Schuss | G01S 7/4026 342/165 |
| 9,031,163 B2 | 5/2015 | Matsuo et al. | |
| 9,255,953 B2* | 2/2016 | Robinson | H01Q 3/267 |
| 9,397,766 B2* | 7/2016 | Puzella | G01S 7/032 |
| 2002/0155818 A1* | 10/2002 | Boros | H01Q 1/246 455/67.14 |
| 2002/0171583 A1* | 11/2002 | Purdy | H01Q 3/267 342/368 |
| 2008/0129613 A1* | 6/2008 | Ermutlu | H01Q 3/267 343/703 |
| 2009/0153394 A1* | 6/2009 | Navarro | G01S 7/4017 342/174 |
| 2011/0006949 A1* | 1/2011 | Webb | H01Q 3/267 342/372 |
| 2011/0287728 A1* | 11/2011 | Kenington | H04B 17/21 455/226.1 |
| 2013/0016003 A1* | 1/2013 | Stirling-Gallacher | H01Q 3/26 342/174 |
| 2014/0062792 A1* | 3/2014 | Schantz | G01S 5/0252 342/451 |
| 2014/0097986 A1* | 4/2014 | Xue | H01Q 3/34 342/372 |
| 2015/0115978 A1* | 4/2015 | Bories | H01Q 15/08 324/601 |
| 2016/0127027 A1* | 5/2016 | Ling | H04B 17/0085 398/115 |
| 2016/0169951 A1* | 6/2016 | Robinson | H01Q 3/267 343/703 |
| 2016/0380711 A1* | 12/2016 | Feigin | H01Q 3/267 342/174 |

FOREIGN PATENT DOCUMENTS

| | | | | |
|---|---|---|---|---|
| WO | WO-2009079174 A1 * | 6/2009 | ........... | G01S 7/4017 |
| WO | WO 2010092082 | 8/2010 | | |

OTHER PUBLICATIONS

Lier, E.; Zemlyansky, M.; Purdy, D.; Farina, D., "Phased array calibration and characterization based on orthogonal coding: Theory and experimental validation", 2010, retrieved from the Internet at: http://ieeexplore.ieee.org/stamp/stamp.jsp?arnumber=5613357.

Alper Yalim, "Phased Array Antenna Calibration and Experimental Validation", Middle East Technical University, 2013, retrieved from the Internet at http://etd.lib.metu.edu/tr/upload/12615911/index.pdf.

Holger Pawlak, and Arne F. Jacob, "An External Calibration Scheme for DBF Antenna Arrays", IEE Transactions on Antennas and Propagation, vol. 58, No. 1, Jan. 2010, retrieved from the Internet at: http://ieeexplore.ieee.org/stamp/stamp.jsp?arnumber=5313929.

C. Fulton, W. Chappell, "Calibration Techniques for Digital Phased Arrays", Purdue University, 2009, retrieved from the Internet at: http://ieeexplore.ieee.org/stamp/stamp.jsp?arnumber=5385979.

Andrew E. Sayers, W. Mark Dorsey, Kenneth W. O'Haver, and John A. Valenzi "Planar Near Field Measurement of Digital Phased Arrays Using Near-Field Scan Plane Reconstruction", IEEE Transactions on Antennas and Propagation, vol. 60, No. 6, Jun. 2012, pp. 2711-2718.

* cited by examiner

| Antenna Element 32 | Gain | Beam Width | Phase Center | Position | Rotation | Axial Ratio | S Parameters |
|---|---|---|---|---|---|---|---|
| 1 | g1 | bw1 | pc1 | p1 | r1 | ar1 | s1 |
| 2 | g2 | bw2 | pc2 | p2 | r2 | ar2 | s2 |
| 3 | g3 | bw3 | pc3 | p3 | r3 | ar3 | s3 |
| • | • | • | • | • | • | • | • |
| • | • | • | • | • | • | • | • |
| • | • | • | • | • | • | • | • |
| n | gn | bwn | pcn | pn | rn | arn | sn |

Antenna Element Characteristics 204

FIG. 7

PLANAR NEAR-FIELD CALIBRATION OF DIGITAL ARRAYS USING ELEMENT PLANE WAVE SPECTRA

CROSS-REFERENCE TO RELATED APPLICATION

This application claims priority to U.S. Provisional Patent Application Ser. No. 61/939,416, filed on Feb. 13, 2014, the disclosure of which is expressly incorporated herein by reference. This application is related to U.S. patent application Ser. No. 14/622,781, filed on Feb. 13, 2015, the disclosure of which is expressly incorporated herein by reference.

STATEMENT REGARDING FEDERALLY SPONSORED RESEARCH OR DEVELOPMENT

The invention described herein was made in the performance of contractual obligations in support of the Department of the Navy and may be manufactured, used and licensed by or for the United States Government for any governmental purpose without payment of any royalties thereon under contract number N00024-03-D-6606, task order BKM37, delivery order 1034, with Johns Hopkins University Applied Physics Laboratory.

BACKGROUND AND SUMMARY OF THE INVENTION

The present invention relates to a calibration system for use with digital arrays. Accurate phase and amplitude calibration is critical to achieving low sidelobes and excellent sidelobe cancellation in high performance phased array antennas. Traditional array calibration approaches involve injecting a reference signal via an external source in a far-field or compact range and tuning array phase shifters to optimize a sensitive performance metric. These approaches are tedious and have limited accuracy due to range reflections and limited precision.

Near-field ranges were implemented for high performance measurement and calibration. Near-field ranges have the advantages of high precision and greatly minimized range effects and can provide volumetric pattern data with each near-field scan. For additional detail on planar near-field measurement of digital phased arrays, see article entitled "Planar Near-Field Measurement of Digital Phased Arrays Using Near-Field Scan Plane Reconstruction", published June 2012 in IEEE Transactions on Antennas and Propagation, Volume 60, Number 6, authors Andrew E. Sayers et al., the entire disclosure of which is incorporated herein by reference. However, an initial difficulty with using a near-field range for calibration was the inability to accurately back-transform from the measured array plane wave spectrum to the element lattice in the aperture plane.

The merged-spectrum technique was used to help address some issues, however, it has an important limitation in that it is only applicable to large arrays for which it can be assumed that all active element patterns are identical. In smaller arrays, sometimes referred to as finite arrays, active element patterns vary from element to element due to variations in the element mutual coupling environments. In these arrays, mutual coupling effects induce amplitude and phase errors which vary from element to element and as a function of scan angle. A method has been needed for highly accurate and efficient finite array amplitude and phase calibration as a function of scan angle. The invention of the present disclosure includes a new system and method which provides these features and is enabled by the implementation and near-field measurement of element-level digital arrays.

Digital arrays are an emerging generation of phased array technology. With either a conventional phased array or Active Electronically Scanned Array (AESA), signals received at each element of the array are phase shifted and combined in an RF combiner to collimate the beam in the direction of interest. The combined signal output of the array interfaces to a receiver. Similarly on transmit, an input signal is split to feed the array elements and a suitable phase shift is provided at each element to collimate the beam in the desired direction. In an element-level digital array, however, receivers are placed at each element of the array and the received signals are converted to streams of digital samples and beam forming and beam steering is performed in the digital processing.

Near-Field Scan Plane Reconstruction is currently used for efficiently measuring element-level digital array antenna patterns. Using this technique, it was shown that any number of far-field volumetric patterns could be obtained from a single planar near-field scan, thus greatly reducing the time required to fully characterize array performance. The limited calibration performance observed in testing programs has created a need for a new calibration technique that is described herein.

According to an illustrative embodiment of the present disclosure, near-field digital array calibration system and method are enabled by digital array technology. The system and method are described as they apply to a digital array operating in the receive mode. However, the system and method are also applicable to a digital array operating in the transmit mode. In general, finite digital array calibration constants can be obtained from the active element patterns of the array. Note that the term active element pattern in the digital array context used here is defined to include all amplitude and phase effects present in the element receive channel as well as amplitude and phase variations resulting from mutual coupling effects. For a given beam steering direction, the array active element patterns across the array yield the amplitude and phase calibration constants for that beam steering direction. Accurate measurement of all of the active element patterns will provide the finite array calibrations over the scan range.

Accurate measurement of individual active element patterns is difficult. Broad active element patterns cannot be measured with sufficient accuracy either in far-field or compact ranges due to chamber effects and other error sources or near-field ranges due to truncation of the near-field scan plane. A key observation is that active element patterns obtained in the near-field range, which are heavily corrupted by the near field scan plane truncation error, nonetheless can be used to provide accurate calibrations. This surprising result is best visualized by considering the near-field scan plane reconstruction technique.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
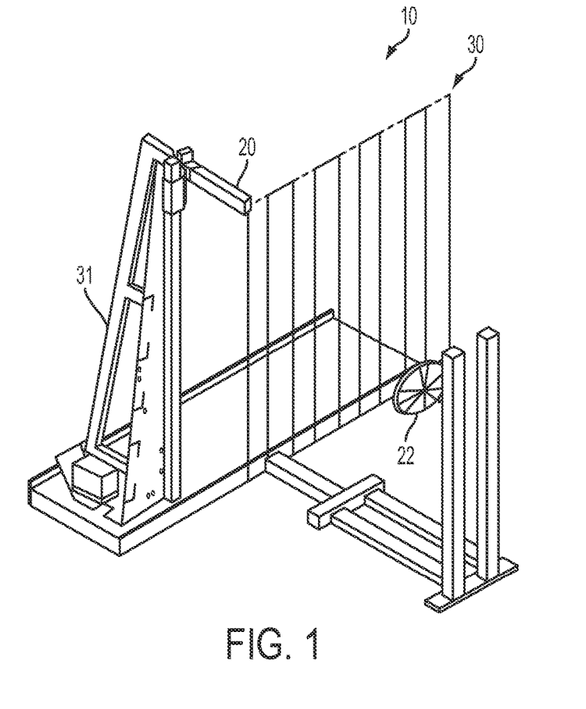
FIG. 1 is a perspective view of an illustrative planar near-field scan.
Figure 2:
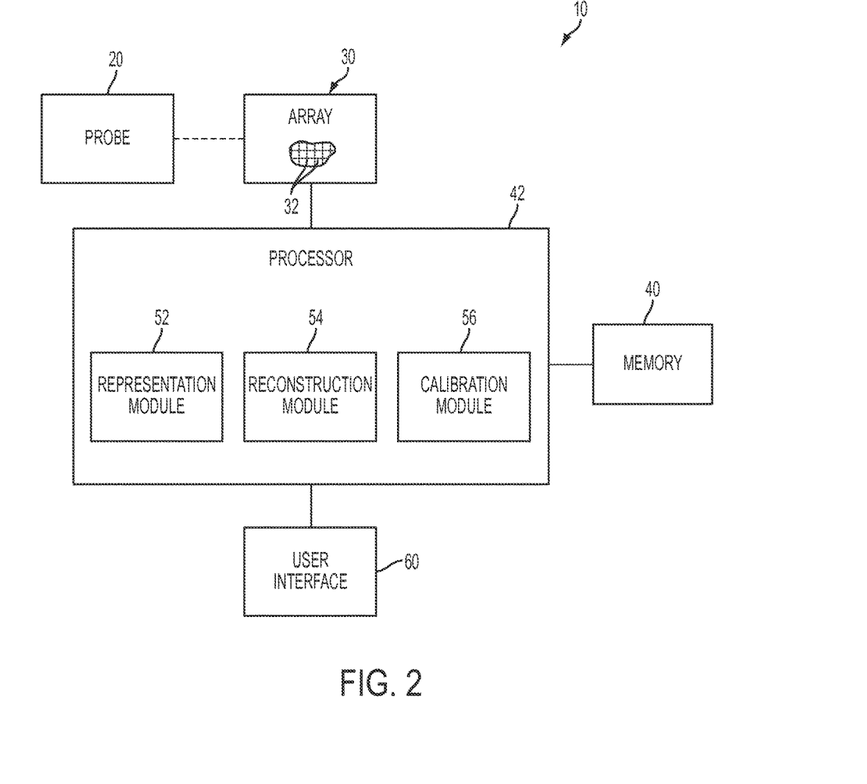
FIG. 2 is a block diagram of an illustrative planar near-field measurement and calibration system.
Figure 3:
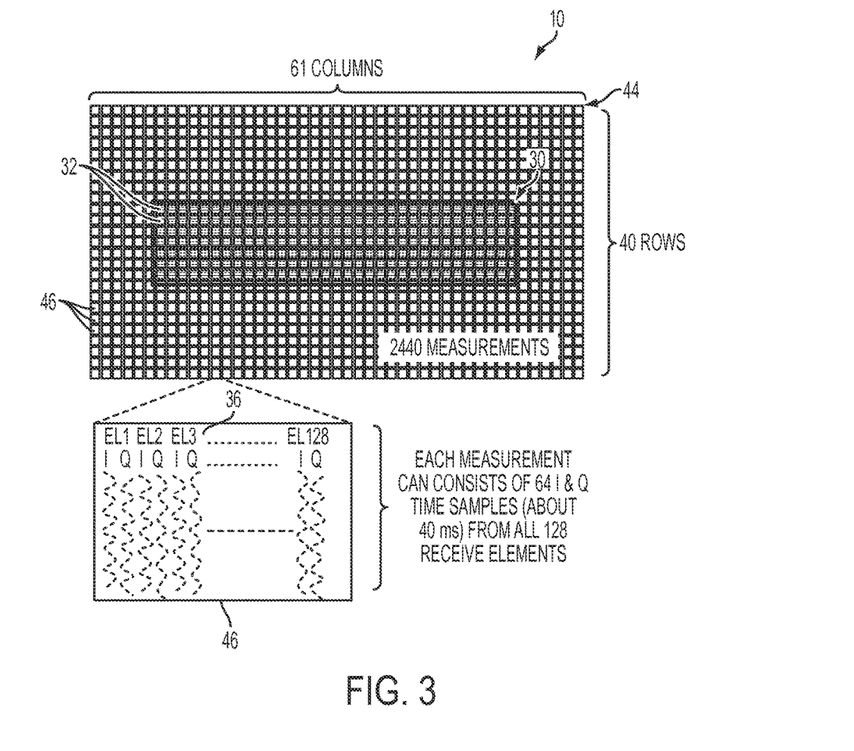
FIG. 3 is an element-level digital array scan plane measurement.
Figure 4:
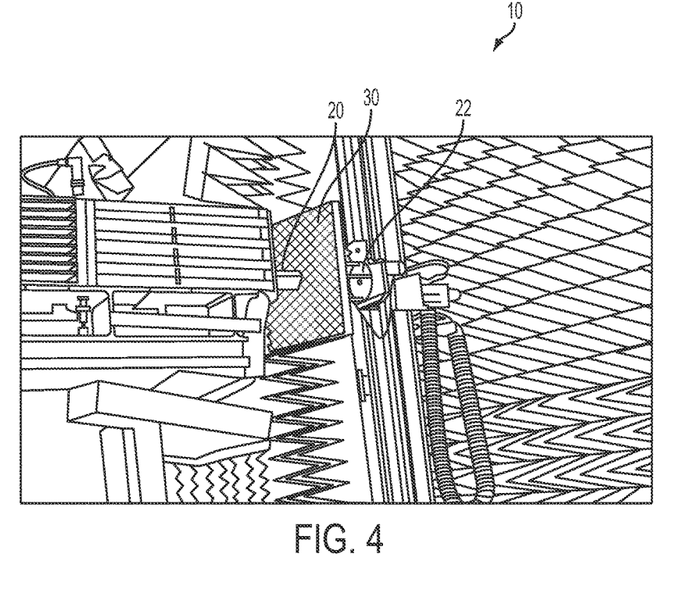
FIG. 4 is an exemplary embodiment of a digital array in near field range.

Referring to FIG. 1, an exemplary planar near-field measurement and calibration system 10 uses a probe 20 to measure the amplitude and phase response of an array 30 at specific points along a plane parallel to an aperture 22. The probe 20 is illustratively coupled to a support 31 for movement along horizontal and vertical axes. In a receive mode, a signal is radiated from the probe 20 and received by the array 30. With reference to FIGS. 2-4, the array 30 includes a plurality of elements 32, each including at least one element-level receiver (See FIG. 3).

For receive near-field measurements, the array 30 is configured to record decimated but otherwise unprocessed, un-calibrated element-level sampled in phase I and quadrature Q signal vector data 36 and download it to a memory 40 (FIG. 2) in communication with one or more processors 42 (FIG. 2), illustratively a computer, for offline processing using the near-field scan plane reconstruction technique. This technique is implemented with a conventional near-field scan plane dimension as shown in FIG. 3. The scan plane 44 is defined by a plurality of sample points or probe positions 46.

The presence of digital receivers at each element 32 within the array 30 allows the near-field scan plane 44 to be measured for every element 32 using only a single near-field scan. At each sample point 46 within the scan plane 44, the I and Q samples 36 are recorded. After the element-level data has been sampled in the near-field, the element I and Q measurements 36 are converted to amplitude and phase. The element near-field amplitudes and phases are then superimposed to reconstruct the near-field response of the high gain array. Upon this reconstruction, the error due to truncation is significantly minimized because the fields outside the truncated region of the scan plane essentially cancel upon near-field beam forming. The resulting near-field response then undergoes near-field to far-field transformation and subsequently yields reliable far-field patterns. The near-field scan plane reconstruction technique was verified by comparisons of patterns with compact range results.

Additionally, instead of beam forming the element scan plane data to form an array near field scan plane data and then transforming to obtain an array plane wave spectrum, one could equivalently transform the individual element near-field scan plane data to obtain the individual element plane wave spectra, and then beam form the element plane wave spectra to obtain an array plane wave spectrum. It follows then that the individual element plane wave spectra yield the desired calibration constants, even though they don't produce useable far-field element patterns.

The processor 42 includes a plurality of logic modules, including modules 52, 54, 56 of FIG. 2, for performing the functions described herein. The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

The processor 42 of the system 10 illustratively includes a representation module 52 configured to derive an array pattern. More particularly, the array pattern $E(\theta,\phi)$ can be represented by (1) where $g_u{}^i(\theta,\phi)$ is the unit-excitation active element pattern which contains the spatial phase term unique to the element location. The unit-excitation active element pattern $g_u{}^i(\theta,\phi)$ can be modified to the phase-adjusted unit-excitation active element pattern $g_u{}^i(\theta,\phi)$ using (2), wherein $\hat{r}$ is a unit vector directed from the origin to the observation point and $r_i$ is the vector from the origin to the location of the current element. The phase-adjusted quantity removes the spatial-phase term from the element pattern. Substituting (2) into (1) yields a representation of the array pattern $E(\theta,\phi)$ of (3).

$$E(\theta,\phi) = \sum_{i=1}^{N} I_i g_u{}^i(\theta,\phi) \tag{1}$$

$$g_p{}^i(\theta,\phi) = g_u{}^i(\theta,\phi) e^{-jk\hat{r}\cdot r_i} \tag{2}$$

$$E(\theta,\phi) = \sum_{i=1}^{N} I_i g_p{}^i(\theta,\phi) e^{jk\hat{r}\cdot r_i} \tag{3}$$

For an element-level digital array, the measured phase-adjusted active element pattern in (3) contains all amplitude and phase errors present in the element receive channel as well as amplitude and phase variations resulting from mutual coupling effects in a finite array. Assuming that the element excitation is chosen to provide the desired amplitude taper, beam shape effects, and phase weighting to steer the beam in the desired direction, calibration is then the process of including in (3) calibration coefficients, $\psi_i$, which compensate for the amplitude and phase errors. Since the mutual coupling induced errors vary with steering angle, the calibration coefficients must also vary with steering angle to achieve a highly accurate calibration of a finite array.

For a beam steering angle of $(\theta_o,\phi_o)$ the phase of the calibration coefficients will be $$\text{Phase}\{\psi_i(\theta_o,\phi_o)\} = -\text{Phase}\{g_p^i(\theta_o,\phi_o)\} \tag{4}$$

If an array is to be aligned only in phase, the calibration coefficients will have magnitude of unity. If an array is to be aligned in both amplitude and phase, magnitude of the calibration coefficient will be $$|\psi_i(\theta_o,\phi_0)| = \frac{|g_p^i(\theta_o,\phi_o)|}{\sum_{i=1}^{N} |g_p^i(\theta_o,\phi_o)|} \tag{5}$$

For a digital array, the amplitude alignment can be implemented by digital element-level amplification or attenuation, with resulting impact of dynamic range or signal-to-noise.

The processor 42 further includes a reconstruction module 54 for digital array plane wave spectrum reconstruction. The finite array calibration problem is a matter of determining the volumetric active element pattern for each element so that the calibration coefficients can be determined as in (4) and (5). However, measuring the individual volumetric active element patterns is a tedious process that would be difficult to implement within the accuracy levels desired for high performance array calibration. Hence we seek plane wave spectrum based solutions using highly accurate planar near-field measurement techniques that naturally yield volumetric pattern data.

The far-field electric field E $(r,\theta,\phi)$ can be written in terms of the plane wave spectrum (PWS) $f(k_x,k_y)$ as $$E(r, \theta, \phi) = j2\pi k \cos\theta \frac{e^{-jkr}}{r} f(k_x, k_y) \quad (6)$$

Substituting (6) into (1) shows that an array PWS is the weighted summation of the element united-excitation plane wave spectra $$f(k_x, k_y) = \sum_{i=1}^{N} I_i f_u^i(k_x, k_y) \quad (7)$$

Calibration coefficients could be determined from the element unit-excitation plane wave spectra in the same fashion as shown in (1)-(5) for the active element unit-excitation pattern. However, as with the active element pattern, individual element unit-excitation plane wave spectra are difficult to accurately measure.

Near-field measurement techniques can be employed to accurately measure an array PWS. For a digital array with a receiver at every element, in a single near-field scan we can measure the sampled near-field for each element. Also, a digital array near-field scan plane reconstruction technique can be used in which the element-level responses in the near-field measurement plane are superimposed prior to performing the Near field-Far field (NF-FF) transformation (8). A resulting near-field response $E_a$ represents the reconstructed planar near-field (PNF) scan plane for the high-gain phased array.

$$E_a = \sum_{i=1}^{N} I_i E_a^i \quad (8)$$

An array PWS can be computed from the superimposed near-field data by applying equation 9. In (9), the measurement area has an overall x-dimension of length $L_x$ and an overall y-dimension of $L_y$. The term $E_a(x',y',z'=0)$ is a superposition of the measured element-level electric fields in the measurement plane.

$$f(k_x, k_y) = \int_{-\frac{1}{2}L_y}^{\frac{1}{2}L_y} \int_{-\frac{1}{2}L_x}^{\frac{1}{2}L_x} E_a(x', y', z' = 0) e^{j(k_x x' + k_y y')} dx' dy' \quad (9)$$

Substituting Equation 8 into Equation 9 yields an expression for an array PWS calculated from reconstructed near-field scan plane data $$f(k_x, k_y) = \int_{-\frac{1}{2}L_y}^{\frac{1}{2}L_y} \int_{-\frac{1}{2}L_x}^{\frac{1}{2}L_x} \sum_{i=1}^{N} I_i E_a^i(x', y', z' = 0) e^{j(k_x x' + k_y y')} dx' dy' \quad (10)$$

An important observation from Equation 10 is that the order of the integration and summation can be reversed yielding $$f(k_x, k_y) = \sum_{i=1}^{N} I_i \int_{-\frac{1}{2}L_y}^{\frac{1}{2}L_y} \int_{-\frac{1}{2}L_x}^{\frac{1}{2}L_x} E_a^i(x', y', z' = 0) e^{j(k_x x' + k_y y')} dx' dy' \quad (11)$$

Equation 11 shows that an array PWS can be reconstructed from a calculation of the element plane wave spectra using only a standard near-field scan plane dimension. The NF-FF transformation in Equation 11 will not produce accurate individual element plane wave spectra (and subsequent element far-field patterns) due to the truncation of integration. Error due to the integration truncation only becomes negligible upon array beam forming. NF-FF transformation in Equation 11 as a modified element unit excitation PWS, $f_u^{\prime i}(k_x,k_y)$ such that $$f(k_x,k_y) = \sum_{i=1}^{N} I_i f_u^{\prime i}(k_x,k_y) \quad (12)$$

where $$f_u^{\prime i}(k_x, k_y) = \int_{-\frac{1}{2}L_y}^{\frac{1}{2}L_y} \int_{-\frac{1}{2}L_x}^{\frac{1}{2}L_x} E_a^i(x', y', z' = 0) e^{j(k_x x' + k_y y')} dx' dy' \quad (13)$$

The processor 42 further includes a calibration module 56 to calibrate the array 30 using element plane wave spectra. A modified element unit excitation PWS, $f_u^{\prime i}(k_x,k_y)$ contains the spatial phase term unique to the element location in an array. The unit excitation PWS can be modified to the phase-adjusted unit-excitation active element PWS using Equation 14. The phase adjusted quantity removes the spatial phase factor.

$$f_p^{\prime i}(k_x, k_y) = f_u^{\prime i}(k_x, k_y) e^{-jk\hat{r}\cdot r_i} \quad (14)$$

The expression of Equation 12 is modified to Equation 15 when the phase-adjusted quantity is used.

$$f(k_x, k_y) = \sum_{i=1}^{N} I_i f_p^{\prime i}(k_x, k_y) e^{jk\hat{r}\cdot r_i} \quad (15)$$

Assuming that element excitation is chosen to provide the desired amplitude taper, beam shape effects, and phase weighting to steer the beam in the desired direction, calibration is then the process of including calibration coefficients, $\psi_i$, which compensate for the amplitude and phase errors included in the active element plane wave spectra. Since the mutual coupling induced errors vary with steering angle, the calibration coefficients must also vary with steering angle to achieve highly accurate finite array calibration.

For a beam steering angle of $(k_{xo}, k_{yo})$ the phase of the calibration coefficients will be $$\text{Phase}\{\psi_i(k_{xo}, k_{yo})\} = -\text{Phase}\{f_p^{ri}(k_{xo}, k_{yo})\} \quad (16)$$

If an array is to be aligned only in phase, calibration coefficients will have magnitude of unity. If an array is to be aligned in both amplitude and phase, the magnitudes of the calibration coefficients will be $$|\psi_i(k_{xo}, k_{yo})| = \frac{|f_p^{ri}(k_{xo}, k_{yo})|}{\sum_{i=1}^{N} |f_p^{ri}(k_{xo}, k_{yo})|} \quad (17)$$

Figure 5:
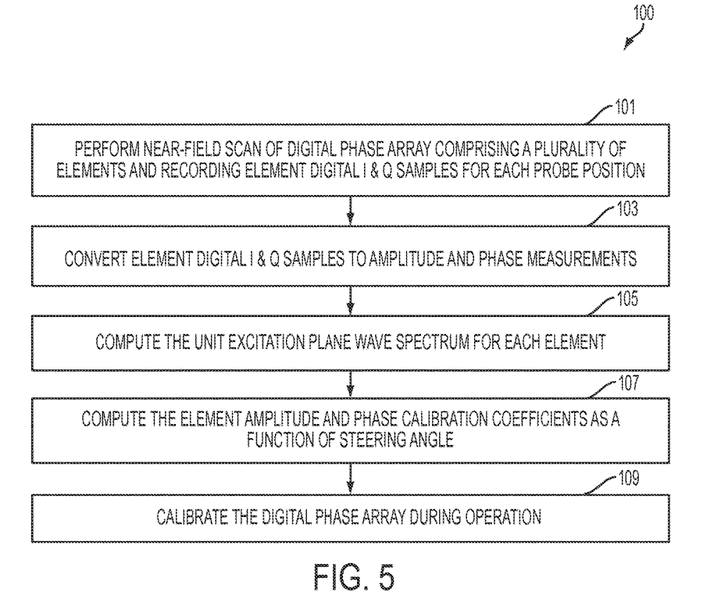
FIG. 5 is a flowchart of an illustrative method of determining the digital array near-field calibration using element plane wave spectra.

Referring to FIG. 5 an illustrative method 100 for calibrating phased array antenna system 10 begins at step 101 by performing a near-field scan of a digital phased array comprising a plurality of elements and recording element digital in phase I & quadrature Q samples for each probe 20 position. The method continues at step 103 by converting the element digital I & Q samples to amplitude and phase measurements. At step 105, the method includes computing a unit excitation plane wave spectrum for each element using equations comprising $$f_u^{ri}(k_x, k_y) = \int_{-\frac{1}{2}L_y}^{\frac{1}{2}L_y} \int_{-\frac{1}{2}L_x}^{\frac{1}{2}L_x} E_o^i(x', y', z' = 0) e^{j(k_x x' + k_y y')} dx' dy'$$

and $$f_p^{ri}(k_x, k_y) = f_u^{ri}(k_x, k_y) TagBox[e^{-j\vec{k}\cdot\vec{r}_i}].$$

With further reference to FIG. 5, the method continues at step 107 by computing element amplitude and phase calibration coefficients as a function of steering angle using equations comprising Phase $$\{\psi_i(k_{xo}, k_{yo})\} = -\text{Phase }\{f_p^{ri}(k_{xo}, k_{yo})\}$$

and $$|\psi_i(k_{xo}, k_{yo})| = \frac{|f_p^{ri}(k_{xo}, k_{yo})|}{\sum_{i=1}^{N} |f_p^{ri}(k_{xo}, k_{yo})|}.$$

At step 109, the method includes calibrating the digital phased array during operation of said digital phased array by adjusting the array and the array element operation or pattern based on said unit excitation wave spectrum data and element amplitude and phase calibration coefficients.

An alternative embodiment of the invention can include a system and method for calibrating an array after an individual element has been replaced. For example, a digital array can have a number of installed array elements. Currently, when an installed array element is replaced the entire array must be removed and shipped to a manufacturer or support activity for recalibration. An exemplary embodiment of the invention can include a process by which an array is manufactured or received for maintenance then calibrated in accordance with an embodiment of the invention. Next, individual array elements can be replaced with a replacement array element then the calibration process described herein can be conducted on the array with the replacement element with resultant data stored. This replacement and calibration step can be repeated for all elements in the array and calibration data stored associated with each replacement array element. The array and replacement elements can then be shipped and installed in their field configuration with the replacement elements and calibration data stored for each replacement array element. When an installed array element fails in the field, then the replacement element associated with a failed array element can be installed then the calibration data for the array associated with the replacement array element can be loaded into the digital array processing system.

The replacement array elements can be matched or have a similar performance characteristics to the elements that are compromised. Replacement array elements can then be installed to a directional digital array system. Array elements originally installed into the directional digital array characteristics are already known, which allows them to be matched to these replacement array elements. One exemplary application of this system allows a ship that uses a directional digital array to stock an assortment of these replacement array elements thereby allowing the directional digital array to be repaired out at sea rather than the entire array being sent back and repaired or replaced at port.

Figure 6:
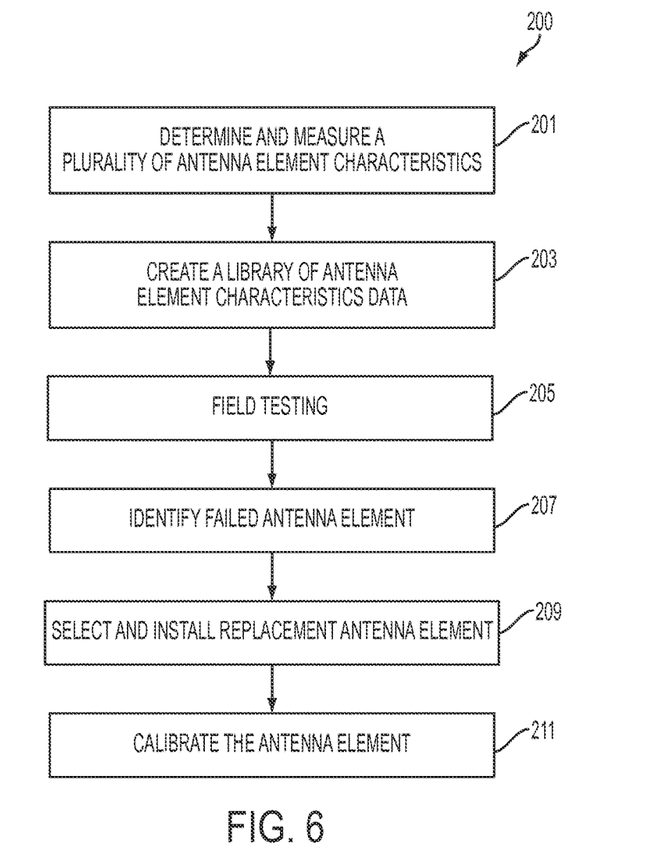
FIG. 6 is a flowchart of an illustrative method of detecting, replacing and calibrating antenna elements.
Figure 7:
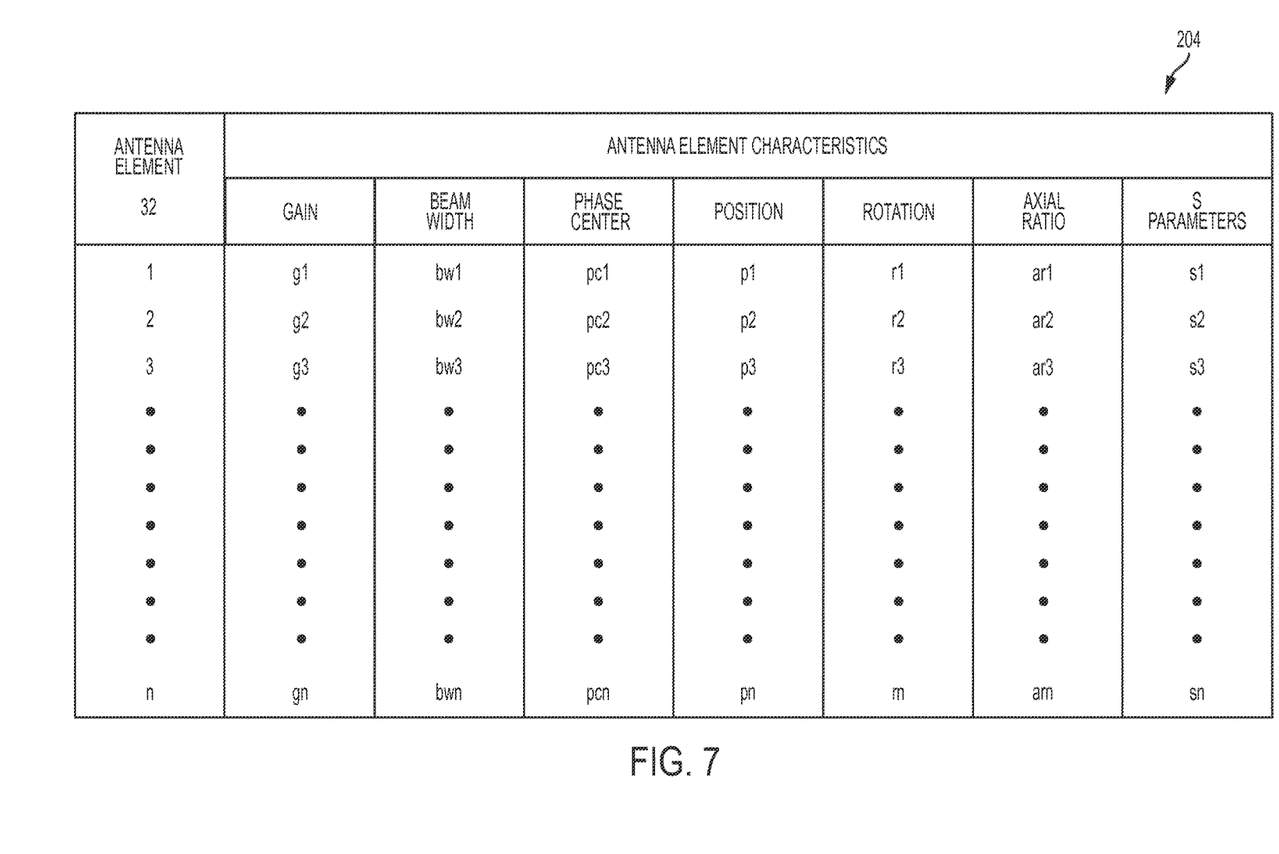
FIG. 7 is a table representing an illustrative library of antenna elements stored in memory.

Additional details of an illustrative method 200 of detecting, replacing and calibrating antenna elements 32 are shown in FIG. 6. The illustrative method 200 begins at step 201 by the operator determining and measuring a plurality of characteristics of the digital array antenna elements 32. Such characteristics may include gain, beam width, phase center, position, rotation, axial ratio, and scattering matrix parameters (S parameters). S parameters include phase delay in that each antenna element 32 slightly different capacitance or inductance along with coaxial cable that connects to the element 32. Tuning adjusts for this phase delay by assigning a delay or programming a delay digitally. The illustrative method 200 continues at step 203 by creating a library of antenna element characteristics data. The illustrative embodiment of FIG. 7 shows a table representing an illustrative library 204 of antenna elements stored in memory. More particularly, characteristics of each antenna element 32 at a facility (e.g., a ship) is stored within library 204, illustratively part of the memory 40 in communication with the processor 42. Each active antenna element 32 in arrays 30 and replacement antenna element 32 stored in inventory is illustratively included within library 204.

With further reference to FIG. 6, the illustrative method continues at step 205 where the operator conducts field testing. This step may be similar to the near field scanning method as further detailed above. This field testing is performed in situ (e.g., at the operational location of the antenna array 30, such as on-board a ship). To initiate the field testing, a test target may be placed at a known location (e.g., GPS location can be used to plot a bearing line from the antenna elements 32 to the test target). An emitter or probe 20 of illustrative system 10 may be used to check the health or functionality of the array 30. Problem antenna elements 32 may be identified at step 207, for example, by comparing the determination of bearing from the processor 42 to the known bearing. A difference between the determined bearing and known bearing is used to determine if the system is operating within a predetermined error percentage. It should be noted that if some elements 32 of the array 30 fail, the processor 42 will illustratively generate a plurality of bearings or angles (center elements) and the system 10 will lose track entirely. If outer elements 32 fail, then accuracy of the array 30 is degraded. In other words, if an element 32 fails, the array 30 is inoperable or will have reduced accuracy.

Once the failed antenna element 32 has been identified, the method continues at block 209 where a replacement antenna element 32 is selected. More particularly, the processor 42 accesses library 204 of antenna elements 32 stored in memory 40 to select a replacement antenna element 32 including characteristics similar to the failed element 32. At step 211, the operator replaces the failed antenna element 32 with the replacement element 32 within the antenna array 30. The operator then calibrates the replacement antenna element 32 after it has been installed within the antenna array 30. More particularly, the operator digitally adjusts or tunes the replacement element 32 to meet calibration specifications (phase center, for example) as defined by the prior failed element 32 (when operating properly). In other words, the operator adjusts the replacement element 32 (by scaling or tuning inputs or data outputs) such that its response matches (or at least closely resembles) the response of the replaced element 32 at original calibration of the array 30.

For a wide band system, a look-up table or database may be stored in memory 40 including characteristics and scaling factors needed to tune or adjust operation and/or inputs/outputs of the replacement antenna element 32. In one illustrative embodiment, phase and amplitude of the replacement antenna element 32 may be calibrated. Angle of arrival may also be calibrated. Calibration of replacement antenna element 32 may not exactly match that of the replaced or failed element 32, but will be sufficient to provide acceptable operation of the array 30.

A system 10 in accordance with an exemplary embodiment of disclosure can include a directional digital array comprising a plurality of array elements and a plurality of replacement array elements each associated with a position of individual elements of the array previously calibrated after being installed into the array during calibration activities to generate alternative configuration calibration data for digital array configurations with said replacement array elements installed. Library 204 of alternative configuration data is also provided for use in loading the alternative configuration calibration data into the directional digital array for operation thereof.

For a non-uniform array, the errors that occur in an array that are generated by mutual coupling aberrations change as you scan the beam. An exemplary embodiment obtains calibration to address mutual coupling induced errors as the array is scanned. Applying the calibration algorithm initially and then from that obtained data, calibration constants can then be applied on the fly as the beam is steered during operation. This provides calibration so the system can be calibrated as it is scanned. In an exemplary embodiment, when measuring a digital array in a near field range, beam port output data is collected for each digital array element at each probe position instead of collecting data for the whole array.

An additional exemplary embodiment contains an element level digital array, which uses a probes that is moved and data is collected for each probe position. Beam forming is thereby done digitally from the one measurement. One scan traversal across the plane by the probe can digitally beam form to any steering angle and by applying the phase inputs digitally in direction desired, a measured pattern for any angle from that one measurement can be obtained. Movement of the probe position is done on a grid that is finer than the grid of the array elements to allow for accurate measurement for calculating a far field pattern from a near field scan. The element level digital array precisely controls and consistently triggers the transmit signal through the probe for each probe position.

Although the invention has been described in detail with reference to certain preferred embodiments, variations and modifications exist within the spirit and scope of the invention as described and defined in the following claims.

The invention claimed is:

1. A directional digital phased finite array system including a recalibration system for recalibrating the directional digital phased finite array system when replacement array elements are installed comprising:

a directional digital phased finite array comprising a plurality of array elements comprising one or more first array elements and one or more second array elements, wherein each of the array elements comprises or is coupled with respective digital receiver;

a control system configured to control the directional digital array system;

a library of a plurality of array element configuration data for use in operating the directional digital phased finite array system, the plurality of array element configuration data comprising one or more replacement array element configuration data each associated with a respective one of said one or more second array elements that each comprises an alternative configuration calibration data for use in operation of the directional digital phased finite array system;

wherein said one or more second array elements each respectively are one of a plurality of replacement array elements each associated with a position of said array elements previously calibrated after being installed into the directional digital phased finite array during one or more calibration activities that also created or generated said alternative configuration calibration data for digital finite array configurations with one or more of said replacement array elements installed; and a calibration system used with a moveable probe system comprising at least one processor including a plurality of modules operative to perform or enable a plurality of calibration data collection steps including:

acquiring the alternative configuration calibration data by performing one or more near-field scans of one or more alternative configurations of the directional digital phased finite array within a scan plane, wherein the one or more alternative configurations comprises one or more combinations of said first and second array elements and recording element digital in phase and quadrature (I & Q) samples for each probe position in the one or more near-field scans, converting the element digital I & Q samples to element near field amplitude and phase measurements for each of the one or more near-field scans, computing a unit excitation plane wave spectrum for each combination of said first and second elements for each of the one or more near-field scans by superimposing said element near-field amplitudes and phases to reconstruct a near-field response data of the directional digital phased finite array and transforming individual element near-field scan plane data to obtain individual element plane wave spectra then beam forming the element plane wave spectra to obtain an array plane wave spectrum, and then computing element amplitude and phase calibration coefficients as a function of steering angle from the array wave plane wave spectrum;

wherein, the control system being further operative to calibrate the directional digital phased array during operation of said directional digital phased array by adjusting the directional digital phased array and each array element's operation or pattern based on said unit excitation wave spectrum data and element amplitude and phase calibration coefficients associated with each of the combinations of said first and second array elements.

2. The system of claim 1, wherein said directional digital phased array comprises a satellite communication system.

3. The system of claim 1, wherein the unit excitation plane wave spectrum is computed for each element using equations comprising $$f_u'^i(k_x, k_y) = \int_{-\frac{1}{2}L_y}^{\frac{1}{2}L_y} \int_{-\frac{1}{2}L_x}^{\frac{1}{2}L_x} E_a^i(x', y', z' = 0) e^{j(k_x x' + k_y y')} dx' dy'$$

and $$f_v'^i(k_x, k_y) = f_u'^i(k_x, k_y) e^{-jk\vec{r}_i}.$$

4. The system of claim 1, wherein the element amplitude and phase calibration coefficients are computed as a function of the steering angle using equations comprising $$\text{Phase } \{\psi_i(k_{xo}, k_{yo})\} = -\text{Phase}\{f_p'^i(k_{xo}, k_{yo})\}$$

and $$|\psi_i(k_{xo}, k_{yo})| = \frac{|f_p'^i(k_{xo}, k_{yo})|}{\sum_{i=1}^{N} |f_v'^i(k_{xo}, k_{yo})|}.$$

5. A method for calibrating a phased array antenna system comprising:
   performing, by at least one processor of a computing system, a first plurality of processing steps comprising calibration activities for a digital phased array including:
      performing a near-field scan of the digital phased array comprising a plurality array elements comprising a plurality of first array elements, the near-field scan comprising operating a near field scan probe in proximity to the plurality of first array elements and recording a first array element digital in phase and quadrature (I & Q) samples for each probe position;
      converting the first array element digital I & Q samples to a first plurality of amplitude and phase measurements;
      computing a first plurality of unit excitation plane wave spectrum for each first array element and then beam form the unit excitation plane way spectrum for each first array element to obtain an array plane wave spectrum;
      computing first array element amplitude and phase calibration coefficients as a function of steering angle from the array plane wave spectrum; and
      calibrating the digital phased array during operation of said digital phased array by adjusting the digital phased array and the plurality of first array elements operation or pattern based on said first plurality of unit excitation plane wave spectrum data and element amplitude and phase calibration coefficients;
   performing a second plurality of calibration processing steps comprising:
      providing a plurality of replacement array elements, each of said plurality of replacement array elements has a matching performance and form with one of said first array elements that is further position matched or associated with a specific position of an associated first array element;
      selecting one of said plurality of replacement array elements, removing a corresponding or respective said first array element having said matching performance, fit and position, removing the corresponding or respective first array element, and installing said selected one of said replacement array elements into the digital phased array;
      repeating, by the at least one processor, said first plurality of calibration activities with the selected one of said replacement array elements and generating, by the at least one processor, alternative configuration calibration data for digital array configurations with said selected one of said plurality of replacement array elements installed; and
   performing, by the at least one processor, a third plurality of processing steps comprising configuration activities including:
      creating a library of alternative configuration data for use in loading the alternative configuration calibration data into the digital phased array for operation thereof after said selected one of said replacement array has been installed.

6. The method of claim 5, wherein said phased array antenna system comprises a satellite communications system.

7. The method of claim 5, wherein element near-field scan plane data is equivalently transformed to obtain element plane wave spectra, and beam form the element plane wave spectra to obtain an array plane wave spectrum.

* * * * *